P. T. HANDIGES.

ADJUSTABLE BRAKE HEAD.

APPLICATION FILED MAR. 30, 1911.

Reissued June 6, 1911.

13,254

2 SHEETS—SHEET 1

Witnesses

Jos F. Collins

Lucien H. Knight

Inventor

Philip T. Handiges,

By Knight Bros.

Attorneys.

P. T. HANDIGES.
ADJUSTABLE BRAKE HEAD.
APPLICATION FILED MAR. 30, 1911.
Reissued June 6, 1911.
13,254.
2 SHEETS—SHEET 2.
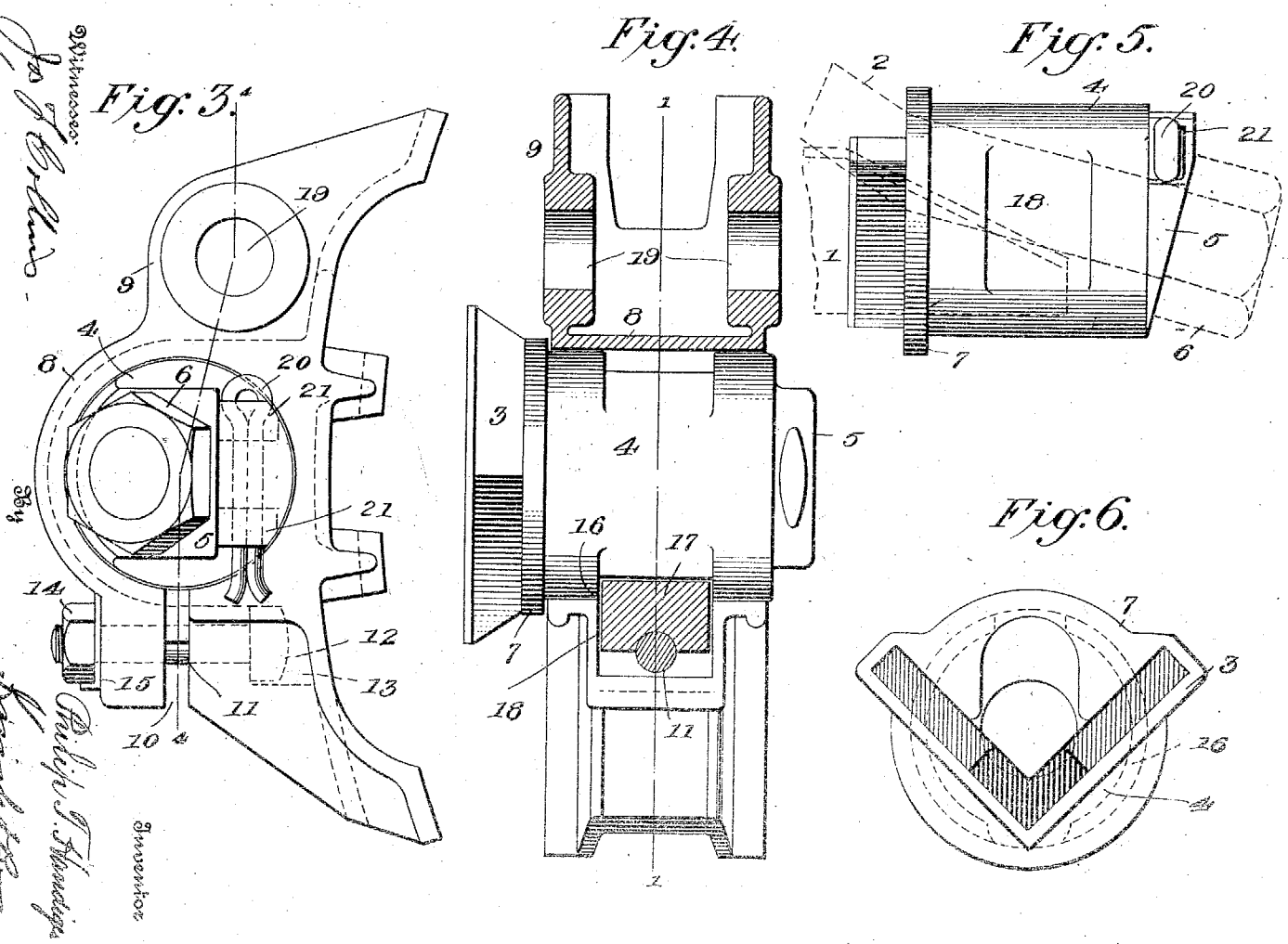
Witnesses:
Jas F. Collins
Vincent V. Knight
Inventor
Philip T. Handiges
By Knight Bros
Attorneys

UNITED STATES PATENT OFFICE.

PHILIP T. HANDIGES, OF EAST CLEVELAND, OHIO, ASSIGNOR TO THE DAMASCUS BRAKE BEAM CO., OF CLEVELAND, OHIO, A CORPORATION OF OHIO.

ADJUSTABLE BRAKE-HEAD.

13,254. Specification of Reissued Letters Patent. Reissued June 6, 1911.

Original No. 886,603, dated May 5, 1908, Serial No. 416,946. Application for reissue filed March 30, 1911. Serial No. 618,043.

*To all whom it may concern:*

Be it known that I, PHILIP T. HANDIGES, a citizen of the United States, and resident of East Cleveland, in the county of Cuyahoga and State of Ohio, (whose post-office address is 93 Elberon avenue, East Cleveland, Ohio,) have invented certain new and useful Improvements in Adjustable Brake-Heads, of which the following is a specification.

My invention relates to a railway brake head mounted upon the brake beam, in a manner to permit angular adjustment of the head so that the braking surface of the shoe will lie concentric with the tread of the wheel with which it is to coöperate, even though the brake beam be hung at different heights relatively to the axis of the wheel. Brake heads of this type as heretofore constructed have developed the disadvantage of working loose upon their bearings and permitting vibration between the parts, which soon becomes destructive of the bearings and is generally objectionable, on account of the noise produced in travel.

My invention overcomes the objection above referred to by so constructing the brake head bearing that it may be caused to bind continuously upon the sleeve or other member which provides the end of the brake beam, particularly in the direction of wear, after the necessary adjustment has been effected and will thus prevent any vibration between the parts and eliminate the noise and destructive wear.

My invention further provides an improved interlock between the brake head and the member to which it is fitted, whereby displacement of the brake head, even in the event of its becoming loose, is prevented.

Figure 2:
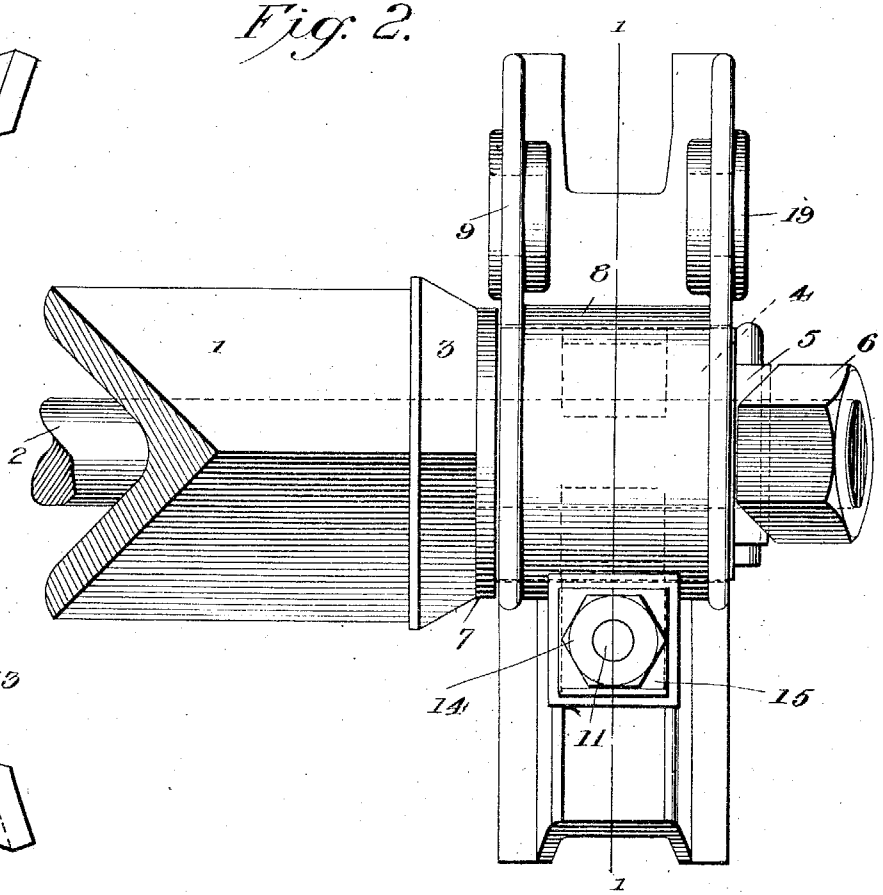
Figure 1:
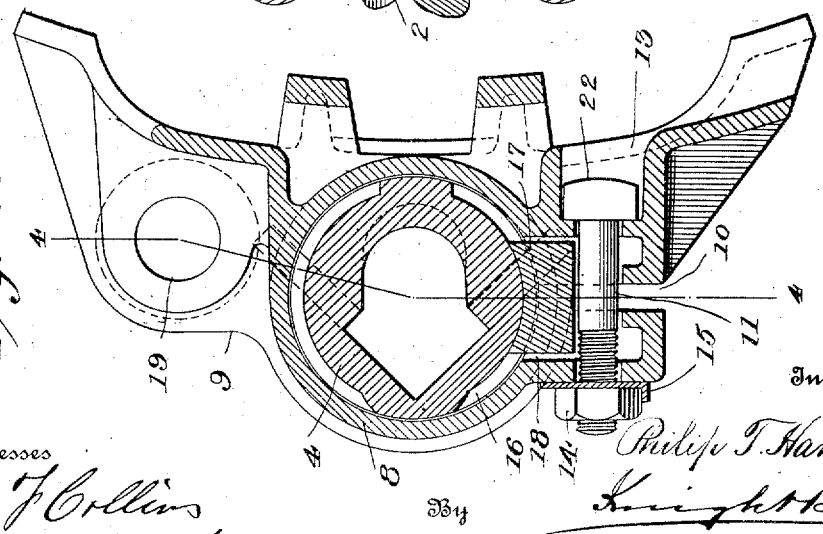

In the accompanying drawings, Figure 1 is a vertical transverse section through the end of a brake beam to which my improved brake head is applied, the section being taken on the line 1—1, Figs. 2 and 4; Fig. 2 is a rear elevation of the end of a brake beam having my improved brake head applied thereto; Fig. 3 is a view of the parts shown in Fig. 2 seen from the right; Fig. 4 is a section through the brake head on the line 4—4, Figs. 1 and 3, the sleeve forming the end of the beam being shown in elevation; Fig. 5 is a plan of the end of the beam provided by the sleeve; and Fig. 6 is an inner end view of the sleeve.

The brake beam to which my invention is shown applied for purposes of illustration is a trussed brake beam, of which the compression member 1 is an angle bar and the tension member 2 is a cylindrical rod. Fitted to the end of the angular compression member 1, through the medium of a socket 3 and providing anchorage for the tension member 2, is a sleeve 4 which unites the compression and tension members of the trussed beam in the manner well known in the art. As will be seen in Fig. 5, the end of the compression member 1 is tapered, as shown in dotted lines, to adapt it to enter the sleeve 4 while said sleeve is provided with an angularly disposed face 5, against which is seated the nut 6 which secures the end of the tension member 2. A shoulder 7 provides an abutment for the brake head.

The sleeve 4 is cylindrical in general outline and receives the correspondingly formed bearing socket 8 of the brake head 9, which thus becomes angularly adjustable on the sleeve so that the bearing face of the brake shoe to be carried by the head, may conform to the tread of the wheel with which it is to coöperate. In order to fix the brake head against angular movement after it is adjusted, the bearing socket 8 is constructed in the form of a split ring or band clamp and is provided on opposite sides of the opening 10, with compressing lugs through which is fitted a clamping bolt 11. Bolt 11 preferably has its head 12 counter-sunk in a squared seat 13, while its nut 14 may be provided with a plate lock 15. Independently of its function of binding the brake-head to fix the angle of the brake-head, selected by pressing the brake-beam toward the wheel, the split bearing socket or ring serves the purpose of taking up wear and stopping vibration in the direction in which it occurs most, namely, in the radial direction of bearing against the wheel, for which purpose the split is located preferably at the bottom or essentially speaking, in a plane substantially perpendicular to said radial line of bearing against the wheel. With this positioning of the split in the bearing socket or ring, the ring may be drawn into firm bearing against the beam end immediately behind the shoe, where vibration and wear most occur, thus not only providing for take up of wear, but in a large measure preventing wear. A further advantage arising from the described positioning of the split is that the relatively heavy and rigid jaw of the clamp integral with the main body of the brake head, is left intact as a substantially semi-circular, direct bearing through which to transmit braking pressure and affords a substantial anchorage toward which the flexible jaw may be drawn, while the flexible jaw is permitted by said location of the split, to extend for a sufficient proportion of the circumference (approximately a semi-circle) to develop ample flexibility therein.

In order to interlock the brake head with the sleeve or beam end and prevent axial displacement without interfering with necessary angular adjustment, or undue flexing of the clamping jaw, there is provided an interlocking part insertible independently of the flexing of the clamping member, such for instance as a part extending across the cylindrical surface of division between the brake-head and the part on which it is mounted, and by its immovable relation to both these members, in an axial direction, preventing relatively axial movement between said members; so that the brake-head and beam are first assembled and interlocked against axial separation, after which any desired adjustment can take place in the split sleeve, either for taking up wear or for binding the brake-head in angular position, without affecting the security against longitudinal displacement by changing the transverse dimension of the split socket and without restricting the range of adjustment of the split socket by the presence of the interlocking means. In the preferred embodiment of these features the sleeve 4 is provided with a circumferentially extending groove or key-way 16, in which is fitted a block or key 17. As shown in Fig. 4, the key 17 fits between the walls of the groove 16 and also between the walls of a pocket 18 formed in the brake head, so that when the key is in the position shown in Fig. 4, it intersects a portion of the brake applying member and the brake head is securely held against axial movement on the beam. But the key-way 16 is extended concentrically with the axis of rotation of the brake head on the beam; hence, the interlock between the head of the beam thus secured does not interfere with any angular adjustment of the head that may be necessary in the realization of the practical advantages of the invention. To provide for putting on and taking off the brake head, the key 17 may drop downward in its pocket 18 a distance sufficient to pass out of engagement with the key-way 16, and thus permit the head to slide axially on the beam. For releasably holding it in locking position, it is made to rest upon the clamping bolt 11, so that when the latter is removed, the key will drop down and after the head is applied, the block may be raised into locking position and the bolt inserted.

19 represents the usual hanger bearing to receive the link by which the brake head is supported from a fixed part of the truck. The brake head is not constructed to be inverted in position for adapting it to forward and rearward presentation; the same end is attained much more economically by making the brake head reversible on the brake beam, for which purpose the key-way 16 occupies an intermediate position in the sleeve 4 and the pocket 18 is formed intermediately in the brake head, so that these parts coincide with either position of the brake head. To adapt the brake beam to be inverted and thus permit it to be presented in either position, the key-way 16 is duplicated on opposite sides of the horizontal diameter of the sleeve 4, as will be readily understood upon reference to Figs. 1 and 4.

In applying the brake head, the parts are assembled in the relation shown in the drawing but with the clamping bolt 11 loosened, so that the brake head is free to rotate on the end of the beam and adapt the position of its brake shoe (not shown) to the tread of the wheel with which it is to coöperate. The brakes are then drawn up tightly so that the brake head will assume the proper angular position, and while the brakes are on, the clamping bolt 11 is screwed up tight and its plate lock applied. If desired, as a precautionary means, an auxiliary device to retain the brake head on the beam may be employed, to prevent displacement of the head in the event that the clamping bolt 11 should work out and permit the key 17 to drop. This supplemental or precautionary device may be conveniently provided in the form of a split cotter pin 20 (see Figs. 2, 3 and 5), passing through the lugs 21 on the outer end of the sleeve 4 and lapping over the bearing 8 of the brake head.

I claim:—

1. A brake head constructed to receive a brake-shoe, having a split-ring bearing-socket and means for drawing the socket upon the brake-applying member, located in position to contract the socket in substantially the direction of braking pressure.

2. A brake head having a substantially semi-circular bearing to receive the brake-applying member in the direction of braking pressure, and a yielding clamping jaw extending from said bearing to complete the embrace of the brake-applying member, and means drawing said yielding member toward the brake head, in substantially the direction of braking pressure.

3. A brake head having an attaching socket adapted to surround the brake-applying member; said socket comprising a substantially semi-circular rigid portion against which the brake-applying member bears in the direction of braking pressure, a flexible portion yielding relatively to the rigid portion in substantially the direction of braking pressure, and means engaging said yielding and rigid portions, and drawing them together.

4. A brake head having an attaching socket adapted to surround the brake-applying member; said socket comprising a substantially semi-circular rigid portion against which the brake-applying member bears in the direction of braking pressure, a flexible portion yielding relatively to the rigid portion in substantially the direction of braking pressure, connected to said rigid portion at top and spaced therefrom at bottom, and means engaging said yielding and rigid portions, and drawing them together.

5. A brake comprising a brake applying member, and a brake head having a bearing, through which it is mounted upon said brake applying member with freedom of angular adjustment; one of said parts having means located in a plane substantially perpendicular to the line of braking pressure for changing its transverse dimensions relatively to the other to cause the parts to bind in their assembled relation.

6. An adjustable brake comprising a brake applying member and having a cylindrical end, and a brake head constructed with a cylindrical bearing adapted to fit upon said cylindrical end with freedom of angular adjustment relatively thereto; and means changing the transverse dimension of one of said parts, in the direction of braking pressure, whereby the bearing is caused to bind on the cylindrical end and maintain the angular position to which the head is adjusted.

7. In an adjustable brake, the combination of the brake applying member or beam having an end with cylindrical surface, and a brake head constructed with a bearing fitting said end of the brake beam; said bearing being in the form of a ring severed in a plane substantially perpendicular to the direction of braking pressure, and having means for contracting it upon the end of the brake beam in substantially the direction of braking pressure.

8. In an adjustable brake, a brake applying member, a brake-shoe-carrying member having a bearing on said brake applying member, which permits relative angular movement between them, means for varying the transverse dimension of one of the said members relatively to the other and independently insertible means for interlocking said members against relative axial movement.

9. In an adjustable brake, the combination of the brake applying member or beam having a cylindrical end constructed with a circumferentially extending groove, a brake head having a bearing fitting said cylindrical end and constructed with a pocket, a key fitted within the pocket of the brake head and extending into the groove of the cylindrical end, and preventing relative axial movement between the parts with which it engages, and independent means for securing the brake head in the angular position to which it is adjusted.

10. In an adjustable brake, the combination of the brake applying member having a supporting end constructed to receive a brake head, a brake head having a bearing constructed to fit rotatably upon said end to provide for angular adjustment relatively thereto and compressible to bind it upon said end after the angular adjustment is secured, a key engaging with and confined against axial movement relatively to both the brake head and supporting end, but movable relatively to one of said parts in the direction of angular adjustment of the head, and means for compressing the bearing of the head upon the supporting end.

11. In an adjustable brake, the combination of the brake applying member having a supporting end constructed to receive a brake head, a brake head having a bearing constructed to fit rotatably upon said end to provide for angular adjustment relatively thereto and compressible to bind it upon said end after the angular adjustment is secured, a key engaging with and confined against axial movement relatively to both the brake head and supporting end, but movable relatively to one of said parts in the direction of angular adjustment of the head, and means for compressing the bearing of the head upon the supporting end; said key being movable radially in one of said parts to release it from engagement with the other of said parts and being held against said radial movement to maintain its interlocking engagement by the compressing means.

12. In an adjustable brake, the combination of the brake applying member having a supporting end adapted to receive a brake head, a brake head constructed with a ring clamp provided with a compressing bolt and fitting and angularly adjustable upon said supporting end and binding thereon to maintain its position after the adjustment is obtained, a key adapted to interlock the brake head with the supporting end; the supporting end being provided with a circumferentially extending key-way into which the key projects, and the brake head being provided with a radially extending pocket in which the key fits; the clamping bolt of the ring clamp extending through the key pocket, beneath the key when the latter is projected into the key-way and holding the key in interlocking position.

13. In an adjustable brake, the combination of the brake applying member having an end constructed to receive the brake head and a brake head reversibly fitted to said supporting end and having means for interlocking it therewith, disposed in intermediate position thereon and engaging with the supporting end in either position of the brake head.

14. In an adjustable brake, the combination of the brake applying member having a supporting end constructed to receive a brake head, and a brake head constructed with a bearing fitted to said end and carrying an interlocking key; the supporting end being constructed with circumferentially extending key ways on opposite sides thereof to permit the brake applying member to be reversed in position relatively to the head.

15. In an adjustable brake, the combination of the brake applying member having a supporting end constructed to receive a brake head and with two oppositely disposed circumferentially extending key-ways therein, and a brake head constructed with a bearing adapted to fit the supporting end reversibly and carrying an interlocking key movable radially into engagement with either of said key-ways.

Signed at Cleveland, Ohio, this 28th day of February, 1911.

PHILIP T. HANDIGES.

Witnesses:
E. S. Smith,
A. W. West.